April 4, 1950

J. R. MOORE 2,502,979

FISH LURE

Filed Sept. 7, 1946

JOSEPH R. MOORE
INVENTOR.

BY

ATTORNEY

Patented Apr. 4, 1950

2,502,979

UNITED STATES PATENT OFFICE 2,502,979

FISH LURE

Joseph R. Moore, Fort Worth, Tex., assignor to Anthony Lyon, Fort Worth, Tex.

Application September 7, 1946, Serial No. 695,349

2 Claims. (Cl. 43—42.29)

This invention relates to artificial baits, or fishing lures, designed for attachment to various types of bait bodies, such as the conventional plug, and its principal object resides in the provision of a quickly detachable and highly flexible member having a multiplicity of flexible strands integral therewith adapting the bait to a pleasing, life-like appearance, and providing an interchangeable buck-tail or fly, which may be rigidly secured to the hook or movable thereon, as desired.

Another object of the invention resides in the provision of an economical artificial lure in which is embodied an effective weed guard protecting the hook against fouling without interfering with the effective operation of the hook or detracting from the appearance of the structure in its effectiveness as a lure.

Broadly, the invention seeks to comprehend the provision of an artificial bait formed from such material as sheet rubber, or the like, affording a long-life, serviceable lure embodying features of design which render it highly effective.

Figure 2:
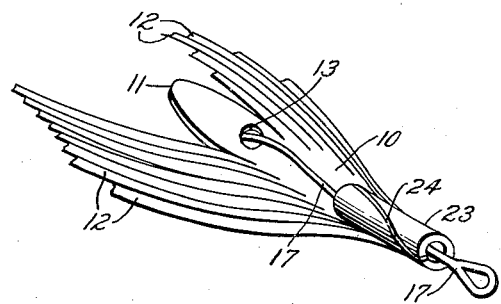
Figure 1:
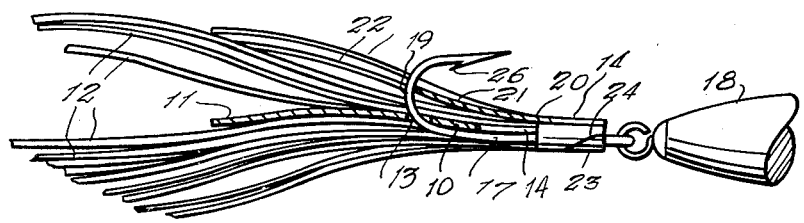

While the foregoing objects are paramount, other and lesser objects will become manifest as the description proceeds, taken in connection with the appended drawings, wherein:

Figure 1 is an inverted perspective illustration of the invention secured to a hook which is detached, and Figure 2 illustrates the invention, in longitudinal section, secured to a hook which is attached to a conventional bait body.

Accordingly, therefore, the invention comprises primarily a body 10 formed with a tail portion 11 and a plurality of streamers, or strands 12 integral therewith and projecting rearwardly of the body 10 on each side of the tail portion 11, as illustrated particularly in Figure 1. To afford a desirable effect and life-like appearance of the invention the streamers or strands 12 are preferably of varying lengths, graduating from the shorter lengths forwardly of the body 10 to the longer strands rearwardly thereof. An aperture 13 is arranged centrally of the body 10 spaced slightly forwardly of the tail portion 11. The curve 19 of the hook 17 extends through the aperture 13 of the body 10, in the manner illustrated in Figure 2, so that the invention is secured against lateral movement with respect to the hook 17 as the bait is operated through the water. A weed guard 20, having the substantial form of the body 10, with its tail member 11 and strands 12, is overlain upon the body 10 and secured to the bait body 18 by the same means by which the body 10 and the hook 17 are secured. The weed guard 20 has a tail portion 21 similar to the tail portion 11 of the body 10, which extends into the curve 19 of the hook 17, as shown in Figure 2, and, while not impairing the effectiveness of the hook 17, functions to prevent the latter from becoming entangled in weeds, and other obstructions, in the water. The weed guard 20, being also formed with strands or streamers 22, cooperate in presenting the life-like movement as the invention is operated in the water. The ample aperture 13, by which the invention is attached to the hook 17, permits the free movement of the invention on the hook 17 at its curve 19 so that the invention tends to oscillate as it moves through the water.

The structure includes a tubular structure 23 integral with the neck portion 14 of the body 10 and by which the assembly is secured to the shank of the hook 17. The member 23 has a spirally arranged slit 24 which, when the member 23 is flexed, opens to admit the hook 17 which is inserted at an angle. The member 23 is preferably of a flexible material but having greater rigidity than the body 10 so as to provide a substantial means for retaining the invention upon the hook 17. Obviously, this arrangement will permit the invention to move longitudinally of the shank of the hook 17 to a limited extent, since there is no connection between the invention and the line or bait body 18 to which the hook is attached. The member 23 may be formed from a small section of rubber tubing, or the like, and vulcanized to the body 10 or secured in any suitable manner thereto. The invention may be removed from the hook 17 by flexing the tubular member 23 so that the slit 24 will open to permit the shank of the hook 17 to pass therethrough.

Manifestly, the structure herein shown and described is capable of considerable modification by persons skilled in the art without departing from the spirit and intent of the invention or the scope of the appended claims.

What is claimed is:

1. In a fishing bait, in combination with a hook attached to a lure, a relatively thin flexible body member formed with a neck and tail portion and streamers extending rearwardly on each side of said tail portion, a split semi-flexible tubular member integral with said neck portion adapting the same for detachable securement to the shank of said hook, means in said body near the tail portion engageable with said hook and a guard member having the form of said body in smaller proportions and secured thereon in superposed relationship.

2. In an artificial bait, in combination with a fish hook attached to a line, a buck-tail formed with a body having a neck and a tail portion, said body comprising a relatively thin sheet having streamers extending therefrom and rearwardly on each side of said tail, means on said neck portion comprising a split semi-flexible sleeve adapting said body to detachable securement to the shank of said hook, other means in said body engageable with a portion of said hook retaining said bait in alignment therewith, and a guard member for said hook, of a similar form but smaller than said body, secured to and superposed on said body.

JOSEPH R. MOORE.

REFERENCES CITED

The following references are of record in the file of this patent:

UNITED STATES PATENTS

| Number | Name | Date |
| --- | --- | --- |
| 2,184,330 | Arbogast | Sept. 26, 1939 |
| 2,208,827 | Accetta | July 23, 1940 |
| 2,261,549 | Hayes | Nov. 4, 1941 |
| 2,386,105 | Gambill | Oct. 2, 1945 |